Feb. 14, 1961 G. E. WILLIAMS ET AL 2,971,552
PNEUMATIC TIRE

Filed June 12, 1958 2 Sheets-Sheet 1

GORDON E. WILLIAMS
CHARLES G. WYMAN
PAUL N. KAUFMAN
INVENTORS

BY Reuben J Wolk
ATTORNEY

Feb. 14, 1961  G. E. WILLIAMS ET AL  2,971,552
PNEUMATIC TIRE
Filed June 12, 1958  2 Sheets-Sheet 2
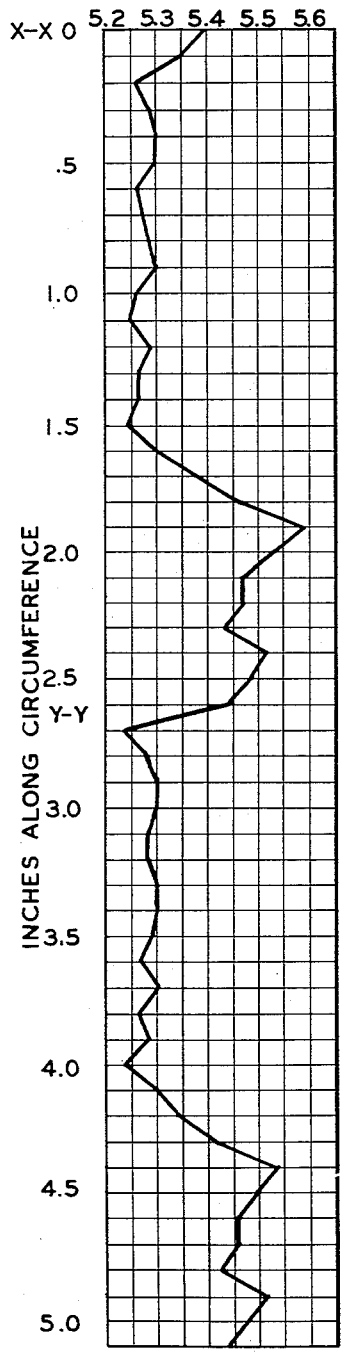
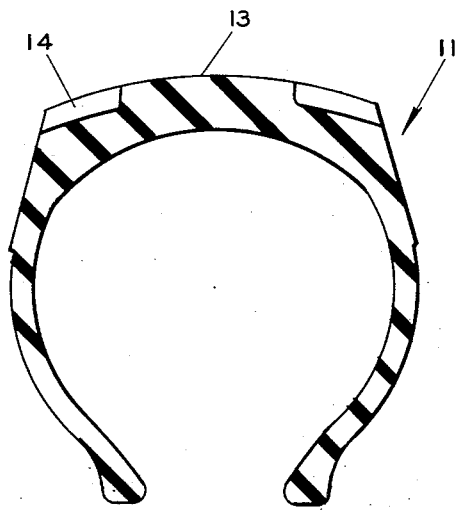
Fig 3
Fig 4
GORDON E. WILLIAMS
CHARLES G. WYMAN
PAUL N. KAUFMAN
INVENTORS
BY Reuben Wolk
ATTORNEY

United States Patent Office 2,971,552
Patented Feb. 14, 1961

2,971,552

PNEUMATIC TIRE

Gordon E. Williams, Charles G. Wyman, and Paul N. Kaufman, Dayton, Ohio, assignors to Dayco Corporation, a corporation of Ohio Filed June 12, 1958, Ser. No. 741,558

3 Claims. (Cl. 152—209)

This invention relates to pneumatic tires, and in particular, to pneumatic tires known as the cross rib or cross lug type.

In most passenger automobile tires the tread is designed with a series of circumferential ribs alternating with grooves in order to give a maximum of ground-contacting surface. Such a tire will provide an extremely uniform weight support throughout the entire tread and is generally preferred by the manufacturer and consumer alike. In standard truck tires, however, a different problem arises. Under the operating conditions to which such trucks are exposed it is found that the circumferential rib and groove type of tire creates several problems which must be overcome. Lateral growth in the reinforcing cords causes a lateral strain in the carcass. When this lateral strain reaches a certain point, the thinnest portion of the tread will tear because the tear strength of the material therein has been reached. This causes the phenomenon known as groove cracking, which is a circumferential crack caused by this lateral strain. Many attempts have been made to overcome this by increasing the number of circumferential grooves, but it has been found that the trouble will persist whenever circumferential ribs are employed.

The next step in the development of truck tires was the design of ribs or lugs which extended transversely, rather than circumferentially, of the tire tread, in which the tread consisted of a series of ribs alternating with grooves in the circumferential direction. With such a design, therefore, a maximum of support was achieved whenever the rib portion of the tire was in contact with the ground. Unfortunately, however, the use of lateral grooves means that there would periodically be a very small amount of support where these grooves came in contact with the ground. Further, such a design causes a highly non-uniform tread wear due to the change from maximum to minimum in the ground contact, lack of resistance of such a tire to side slippage due to the voids or grooves located between the lateral ribs, severe stress and elongation of the tire cord material and strain on the rubber used within the tread, and heel and toe wear of the ribs.

The present invention contemplates a design which will overcome all of the above problems, and it is a primary object of this invention to eliminate the tendency for groove cracking in tires.

It is a further object of this invention to provide a tire having a uniform tread wear.

It is still another object of the invention to provide a tire having a uniform tread contact.

It is still another object of the invention to provide a design that will tend to lengthen the life of the materials used in the tire.

The above and other objects are accomplished in the present invention by the design of a tire tread in which the rib and groove pattern is a compromise between the circumferential and the transverse types referred to above. In this design the pattern is essentially a cross rib or lug type, but these ribs or ground-contacting portions, as well as the voids defined therebetween, are at an angle with the surface of the tire. This angle is compound in order to provide a uniform weight loading or ground-contacting area and to eliminate the side slippage which exists in a conventional cross rib. By means of the specific design contemplated herein, the large variation in ground-contacting surface which is found in a conventional cross rib tire is largely eliminated and the present tire has an amazingly low variation between the maximum and minimum ground-contacting area at any given moment. By avoiding the abrupt change from void to rib found in straight lateral rib designs, the heel and toe wear which so often occurs is eliminated. At the same time, it is possible to use improved synthetic rubbers and reduced cord plies in the tire because of the elimination of the forces which tend to create stresses, cracks and wear.

The above advantages will be further brought out by the following description, claims and drawings in which:

Figure 3 is a section of the novel tire taken along lines 3—3 of Figure 2.

Figure 4 is a chart indicating the actual amount of ground-contacting portion of the tire taken at different points along the circumference of the tread.

Figure 1:
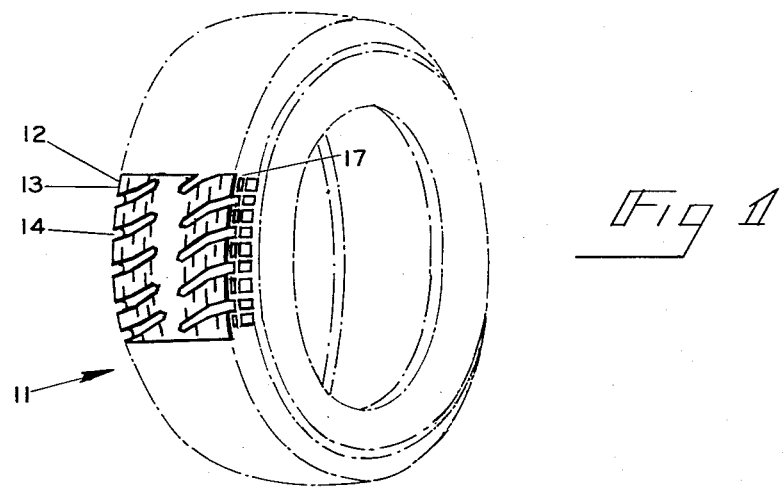
Figure 1 is a perspective view of a tire embodying a preferred form of the present invention.
Figure 2:
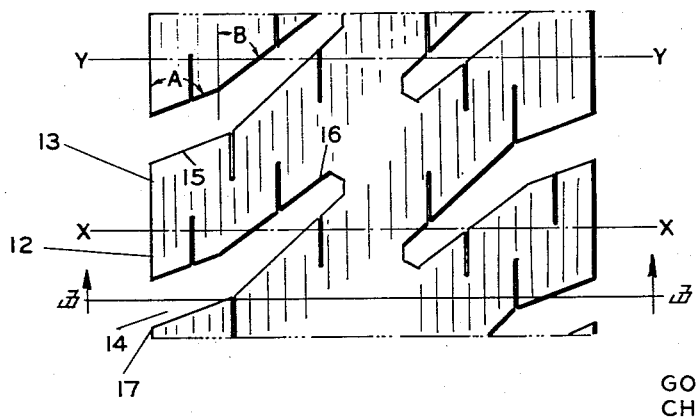
Figure 2 is an enlarged elevation of a portion of the tire tread of Figure 1.

Referring now to the drawings, Figure 1 illustrates a pneumatic tire of the type contemplated in the present invention and particularly designed for truck use. The tread of the tire is designated by reference numeral 12 and consists of a ground-contacting surface or ribs 13 and the circumferentially spaced voids or grooves 14 which are located between adjacent portions of the ground-contacting surface. As is best shown in Figure 2, each void 14 consists of an outer portion 15 and an inner portion 16 which extend at different angles with respect to the longitudinal axis of the tread. The portion 15 extends at an angle A, while the portion 16 extends at a lesser angle B, with the longitudinal axis. More specifically, the angle A is between 65 and 75 degrees with the longitudinal axis and is preferably approximately 70 degrees; while the portion B extends at an angle between 50 and 55 degrees with the longitudinal axis and is preferably approximately 53 degrees. The outermost portion of the void at its intersection with the shoulder 17 of the tire is slightly wider than the remaining portions in order to improve the stone ejecting properties of the tire. As can be readily seen in Figures 1 and 2, the voids on both sides of the tread alternate so that the major areas thereof do not fall within the same transverse portion of the tread.

In order to bring out more fully the feature previously described in which the variation in ground-contacting area is minimized, specific figures will be used with the tread and the amount of contact area. It should be borne in mind, however, that this invention is not intended to be limited to these specific sizes, but they are merely illustrative for demonstrating the principle of the invention. In one form of the tire the tread has a width of 6.92 inches. In order to determine the exact variation a series of measurements laterally of the tread were taken starting at line X—X of Figure 2 at intervals of 1/10 of an inch along the circumference up to approximately line Y—Y of Figure 2.

Figure 4 is a graphic chart of the results of such a measurement in which the point marked "zero" represents the line X—X. In this particular design, the pattern repeats at 2.552 inches, and, therefore, line Y—Y represents the end of a complete pattern. The chart of Figure 4, however, illustrates a total length of 5 inches along the circumference giving approximately two repeats of the pattern in order to more fully illustrate the principle of the design. The points designated by the ordinate of this chart are in tenths of inches along the circumference as stated; while the abcissa of the chart is in terms of five hundredths of an inch of ground-contacting area transversely of the tread. As can be seen by this chart, the maximum ground-contacting surface at any of these points plotted is 5.59 inches. Therefore, in relation to the tread width of 6.92 inches the maximum possible ground-contacting area is approximately 81 percent. The minimum ground-contacting area at any place along the circumference as shown by the chart is 5.24 inches or approximately 76 percent. The resultant variation, therefore, is .35 inch, or approximately five percent. The amount of ground contact actually represents a line which is the intersection of a radial plane with the plane of the tread, so it may be stated that there is a maximum variation between the intersection of any radial plane and the plane of the tread of about five percent, and in no case more than six percent. It is this remarkably small variation in ground-contacting surface along the circumference which provides such highly improved results in tire performance as described above. This small variation can be better appreciated when compared with certain competitive truck tires of modified cross rib type which have been measured in a similar fashion to that described above. A chart of the variations might be made similar to the chart of Figure 4 but it will suffice to illustrate the maximum and minimum points by the following table:

| Tread Design | Ground Contact (Inches) | | Ground Contact (Percent) | | Percent Variation |
|---|---|---|---|---|---|
| | Max. | Min. | Max. | Min. | |
| Present Appln | 5.59 | 5.24 | 81 | 76 | 5 |
| Tire A | 5.99 | 3.52 | 92 | 54 | 38 |
| Tire B | 3.00 | 0 | 40 | 0 | 40 |
| Tire C | 5.85 | 4.76 | 83 | 67 | 16 |

As can be seen by the above chart, the variation in the present invention is so small compared to the prior art designs that the objectives of uniform tread wear, uniform tread contact and elimination of heel and toe wear are readily achieved. Thus, it can be seen by means of the novel design of the ribs and grooves, a new and improved relationship is obtained in a tire. This principle will exist with other variations than those specifically illustrated and described above, and it is not intended that the details shown shall be limiting upon the principles herein described.

We claim:
1. A cross rib tire having a tread comprising a ground-contacting surface and a plurality of voids, said voids in the form of circumferentially spaced grooves extending partially across the width of said tread, the outer portion of said grooves located at an angle of between 65 and 75 degrees with the longitudinal axis of the tread and the inner portion of the grooves located at an angle of between 50 and 55 degrees with the longitudinal axis of the tread, said ground-contacting surface providing no less than 76 percent and no more than 81 percent of the total width of said tread at the intersection of any radial plane with the plane of said tread.

2. A cross rib tire having a tread comprising a ground-contacting surface and a plurality of voids, said voids in the form of circumferentially spaced grooves extending partially across the width of said tread, the outer portion of said grooves located at an angle of between 65 and 75 degrees with the longitudinal axis of the tread and the inner portion of the grooves located at an angle of between 50 and 55 degrees with the longitudinal axis of the tread, said ground contacting surface varying no more than six percent of the total width of said tread between the intersection of any two radial planes with the plane of the tread.

3. A cross rib tire having a tread comprising a ground-contacting surface and a plurality of voids, said voids in the form of circumferentially spaced grooves extending partially across the width of said tread, the outer portion of said grooves located at an angle of between 65 and 75 degrees with the longitudinal axis of the tread and the inner portion of the grooves located at an angle of between 50 and 55 degrees with the longitudinal axis of the tread, said ground-contacting surface varying approximately five percent of the total width of said tread between the intersection of any two radial planes with the plane of the tread.

References Cited in the file of this patent

UNITED STATES PATENTS

| D. 68,150 | Love | Sept. 8, 1925 |
| D. 72,826 | Gillam | June 14, 1927 |
| D. 170,710 | Nellen | Oct. 27, 1953 |
| 1,127,517 | Richardson | Feb. 9, 1915 |
| 2,592,557 | Gibbs | Apr. 15, 1952 |

FOREIGN PATENTS

| 484,176 | Great Britain | 1938 |
| 54,595 | Denmark | Mar. 28, 1958 |